AUSTIN C. COOLEY
INVENTOR.

BY Alfred P. Lorenzo
Paul P. Holmes

ATTORNEYS

Dec. 29, 1970

A. C. COOLEY 3,551,317

ELECTROLYTIC APPARATUS FOR RECOVERING A
METAL FROM A SOLUTION

Filed Aug. 29, 1968

AUSTIN C. COOLEY
INVENTOR.

BY Alfred P. Lorenzo
Paul P. Holmes
Walter O. Hodsdon
ATTORNEYS

United States Patent Office 3,551,317
Patented Dec. 29, 1970

3,551,317
ELECTROLYTIC APPARATUS FOR RECOVERING A METAL FROM A SOLUTION
Austin C. Cooley, Rochester, N.Y., assignor to Eastman Kodak Company, Rochester, N.Y., a corporation of New Jersey
Filed Aug. 29, 1968, Ser. No. 756,225
Int. Cl. C23b 5/68; B23p 1/00; B01k 3/04
U.S. Cl. 204—212                                    12 Claims

ABSTRACT OF THE DISCLOSURE

Apparatus for recovering a metal from a solution in which the metal is present in ionic form, including a cylindrical electrode which is rotated about its axis, a flexible sheet electrode spaced from and partially surrounding the surface of the cylindrical electrode, means for impressing an electric potential across the electrodes, and means for directing the solution onto the surface of the cylindrical electrode so that it is conveyed through the gap separating the electrodes by the rotation of the cylindrical electrode, whereby the metal ions in the solution plate out on the electrode surface of lower potential. The apparatus is particularly well suited for use with viscous solutions, for example, in the recovery of silver from vicous fixing solutions employed in photographic processing.

BACKGROUND OF THE INVENTION

(1) Field of the invention

This invention pertains in general to electrolytic recovery of metals and in particular to a novel electrolytic apparatus for recovering a metal from a solution containing ions of the metal. The apparatus of this invention is especially well suited for use with viscous solutions and is advantageously employed in recovering silver from viscous fixing solutions employed in photographic processing.

(2) Description of the prior art

Recovery by electrolytic techniques of a metal from a solution which contains ions of such metal is well known. In its simplest terms, the process involves immersing a pair of electrodes in the electrolytic solution and impressing across the electrodes a voltage of sufficient magnitude to effect migration of the metal ions to the cathode and deposition of the metal on the cathode surface in the form of a coherent plate which is subsequently removed. Electrolytic cells capable of accomplishing the desired recovery of the metal have been developed in diverse forms embodying a variety of principles of operation and corresponding structural variations. One important aspect in which many of the cells developed heretofore have differed pertains to the manner in which agitation of the electrolytic solution has been effected, it being well recognized that some form of agitation is essential to achieve a reasonable efficiency of recovery. Thus, apparatus heretofore proposed has accomplished the desired agitation of the electrolyte by, among other means, pumps for circulating the electrolyte at high velocities, impeller-type mixers, paddle wheels revolving in close proximity to the cathode, gas sparging, and ultrasonics. Each of these methods can be effectively employed with the electrolytes which are ordinarily encountered, i.e. aqueous solutions of a viscosity which does not differ greatly from that of water. However, these techniques are not effective for use with a high viscosity electrolyte and it is toward the objective of providing a novel electrolytic apparatus adapted to function effectively with such high viscosity electrolytes that this invention is directed.

SUMMARY OF THE INVENTION

The apparatus of this invention is effective in recovering metals from any metal-ion-containing solution and is particularly useful because it is well adapted to treatment of viscous electrolyte solutions which conventional electrolytic cells are not capable of handling efficiently. While the invention is specifically described herein with reference to the recovery of silver from viscous photographic fixing solutions, it may also be utilized in many other electrolytic processes.

In accordance with this invention, there is provided an electrolytic apparatus comprising a cylindrical electrode which is rotated about its axis, a thin flexible sheet electrode which is narrowly spaced from an partially surrounds the cylindrical electrode, means for impressing an electric potential across the electrodes, and means for conveying the solution to be treated through the narrow gap separating the electrodes so that the electric potential will cause metal ions present in the solution to move towards the electrode of lower potential, i.e. towards the cathode, and to plate out on the surface thereof. Since the flexible sheet electrode only partially surrounds the cylindrical electrode, access to the surface of the cylindrical electrode is readily available and the solution can be uniformly applied across the full width of the cylindrical surface as a thin layer and is then carried past the sheet electrode as a result of the rotation of the cylindrical electrode. By virtue of its flexible character and the manner in which it is supported, the sheet electrode is free to adjust itself to a substantially constant spacing with relation to the cylindrical electrode and, since the spacing between the electrodes can be made very small and the cylindrical electrode can be rotated at relatively high speeds, good agitation of the solution within the gap separating the electrodes is effectively achieved. As a result of the close proximity of the sheet electrode to the cylindrical electrode, the rapid movement of the solution through the gap, and the shearing action which provides effective agitation of the solution, ions depleted from adjacent the plating surface are immediately replenished and the efficiency of the process is high. Recovery of the metal is a simple procedure since the metal plate which forms on the cathode surface can be easily peeled or scraped off.

In one embodiment of the invention, the rotatable cylinder serves as the anode and the flexible sheet as the cathode and, thus, as the surface on which the metal plate is deposited. In an alternate embodiment, the polarity is reversed so that the rotatable cylinder serves as the cathode, the flexible sheet serves as the anode, and the metal plate is deposited on the cylindrical surface.

As pointed out hereinabove, the electrolytic apparatus disclosed herein is capable of handling viscous electrolytes which cannot be successfully treated in apparatus heretofore known to the art. Thus, the apparatus of the present invention finds particular utility in the recovery of silver from the viscous fixing solutions which have been recently put into use in the photographic industry. These viscous fixing solutions, which are coated on the film or photographic paper and typically have a viscosity of several thousand centipoises, cannot be treated in conventional cells for electrolytic recovery of silver from photographic fixing solutions and for this reason are ordinarily discarded in spite of the loss of valuable silver that this entails. With the apparatus disclosed and claimed herein, however, they can be treated in an economical and efficient manner to recover a major portion of the silver contained therein and the apparatus can be readily adapted for use in either large scale processing operations where the amount of solution to be treated is very large or in small scale facilities involving the use of a single photographic processor. In view of the fact that the novel electrolytic apparatus described herein can be made very compact, it is especially valuable for use with portable photographic processing machines.

DESCRIPTION OF THE PREFERRED EMBODIMENT

Figure 1:
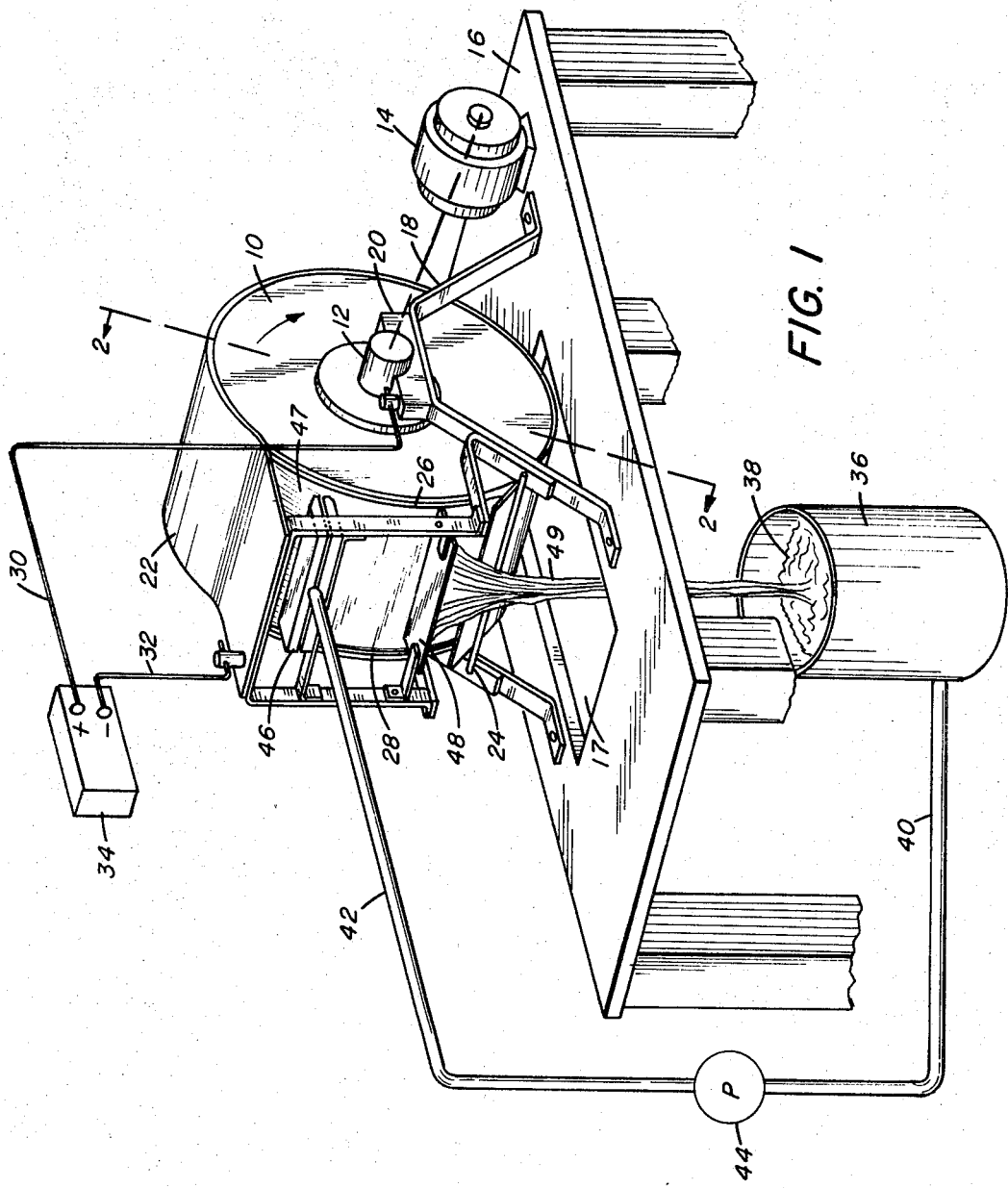
FIG. 1 is a perspective view of an electrolytic apparatus constructed in accordance with this invention.

As illustrated in FIG. 1, cylindrical anode 10 is mounted on horizontally disposed shaft 12 to permit rotation about its axis and is driven in a clockwise direction, as indicated by the arrow, by variable speed motor 14 which is mounted on bench 16 and operatively connected to shaft 12 of anode 10 by a suitable drive shaft and coupling (not shown). The weight of anode 10 is carried by framework 18, which is bolted to bench 16, and, in order to permit rotation, anode 10 is mounted so that shaft 12 rests on support 20 at one end and is positioned with its opposite end within a suitable journal box (not shown). Flexible sheet electrode 22 serves as the cathode and is mounted so that it assumes an arcuate configuration and so that it is narrowly spaced from and partially surrounds the cylindrical surface of anode 10. At its upper end, cathode 22 is removably attached to a section of framework 18, while at its lower end it is not rigidly supported but merely rests against rod 24 which is fixedly attached to a different section of framework 18. In this manner, cathode 22 is supported in such a way that it is free to assume different positions with regard to its spacing from anode 10. To aid in maintaining cathode 22 in the proper spaced relationship with respect to anode 10, insulating strips 26 and 28, which are thin and flat and composed of an electrically insulating material such as rubber, are fastened near the peripheral edges of anode 10 by means of a suitable adhesive and extend around the entire cylindrical surface. Electric current to operate the apparatus is supplied by means of lines 30 and 32 connected, respectively, to anode 10 and cathode 22 and to power supply source 34.

Tank 36, which is partially filled with a metal-ion-containing solution 38 which is to be treated to recover the metal contained therein, for example, a viscous photographic fixing solution containing silver ions, is positioned beneath anode 10. Solution 38 is pumped from tank 36, via pipes 40 and 42 and constant discharge pump 44, to coating hopper 46 from which it is discharged at a substantially uniform rate across substantially the full width of the cylindrical surface of anode 10 to form thereon a thin layer 47. As a result of the rotation of anode 10, the layer of solution 47 is conveyed around through the narrow gap separating anode 10 and cathode 22 and, as it passes through this gap, the flow of current between anode 10 and cathode 22 causes the metal ions present therein to plate out on the inner surface of cathode 22 as a thin coherent metal plate. The layer of solution 47 covering the cylindrical surface of anode 10 tends to adhere to this surface, but it is stripped off by the action of scraper 48, which is preferably provided with a rubber edge and is mounted on framework 18 so that it lightly engages the surface of anode 10 as it rotates, and, accordingly, the solution falls in a continuous stream 49 from beneath scraper 48 and passes through opening 17 in bench 16 and thence into tank 36. In place of scraper 48, an air knife may be used to remove the adhering solution and other suitable means for accomplishing this purpose will also be apparent to those of ordinary skill in the art.

Figure 2:
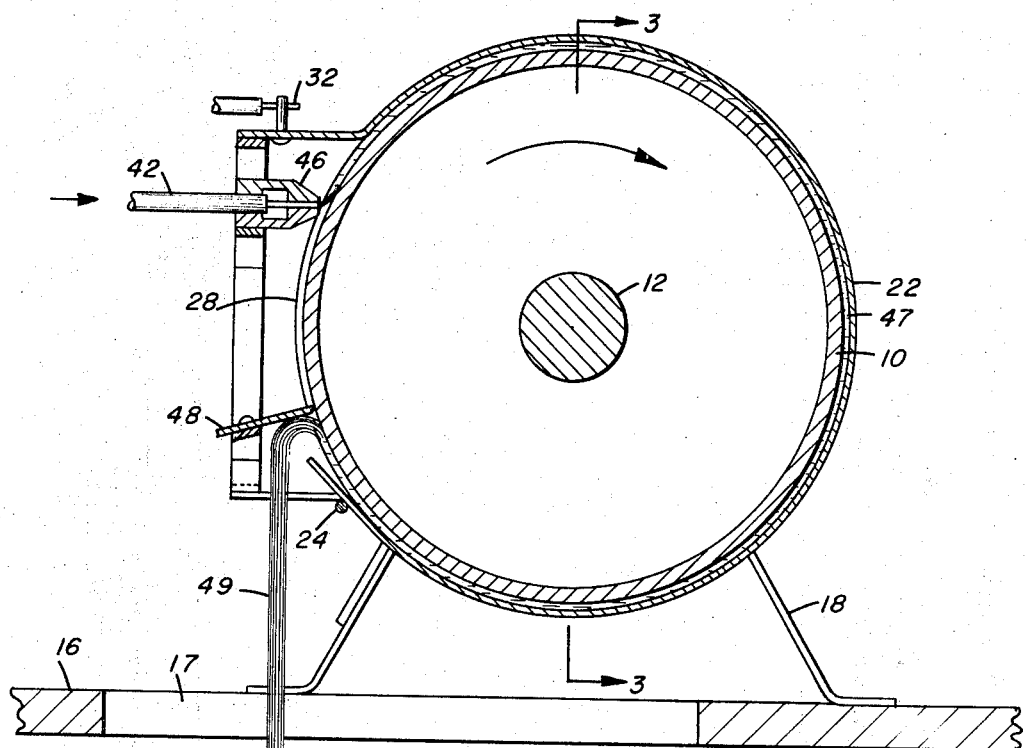
FIG. 2 is a sectional view taken along the line 2—2 of FIG. 1.
Figure 3:
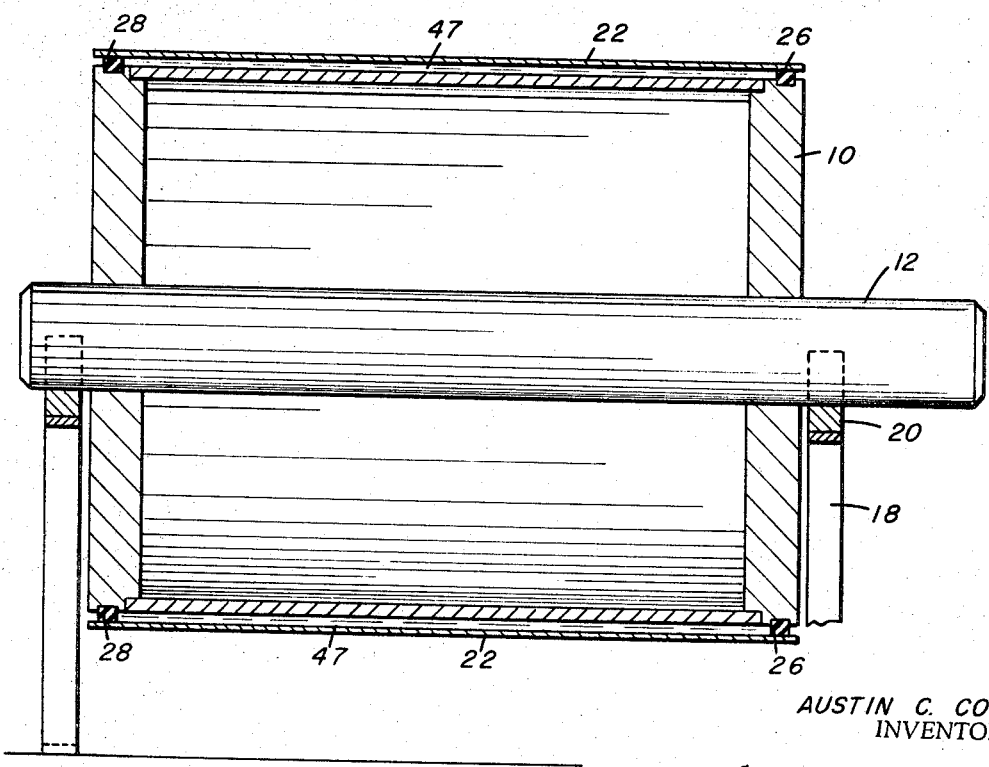
FIG. 3 is a sectional view taken along the line 3—3 of FIG. 2.

Referring to FIGS. 2 and 3, it will be seen that cathode 22 is separated from anode 10 by a very narrow uniform gap and that the solution applied by coating hopper 46 completely fills this gap and thereby continuously maintains contact with both anode and cathode adequate to permit current flow therebetween. Actual contact between anode 10 and cathode 22 must, of course, be prevented so as to avoid short circuiting, and insulating strips 26 and 28 serve to prevent such contact from occurring. The use of such insulating strips is not, however, essential, since the layer of solution will tend to keep cathode 22 at a uniform distance from anode 10 and the width of the gap maintained between anode 10 and cathode 22 will be determined by the flow rate of solution applied by coating hopper 46. Where the viscosity of the solution being treated is high then it is particularly effective in maintaining the cathode in the proper position and the need for insulating strips is less. However, insulating strips 26 and 28 also serve to retain the solution so that it does not spill over the edges of cathode 22 in the region directly beneath anode 10 but rather flows in a continuous stream from scraper 48 for collection in tank 36.

In operation, the apparatus illustrated herein is positioned so that the longitudinal axis of cylindrical anode 10 is in a substantially horizontal position, a quantity of metal-ion-containing solution, such as a viscous photographic fixing solution which has been used in processing and therefor contains silver ions, is charged to tank 36, electric current is supplied to energize electrodes 10 and 22, and motor 14 and pump 44 are then started. As the solution flows from coating hopper 46 onto the surface of anode 10 it is carried by the rotation of anode 10 through the gap separating anode 10 and cathode 22 and, by virtue of the potential difference between them, the silver ions present in the solution move to the surface of cathode 22 and plate out thereon. The flow rate through coating hopper 46 and the speed at which anode 10 is rotated are regulated so that all of the solution supplied will be drawn through the gap between anode and cathode as a result of the rotation, and the volume of the solution will be sufficient to maintain the gap full at all times. By the time any particular element of solution has travelled from the point where it is applied to the anode at coating hopper 46 to the point where it is removed at scraper 48, at least a part of the silver contained therein will have been removed and this element of solution will then be returned to tank 36 where it will be mixed with the main body of solution. At each revolution, the surface of anode 10 is wiped substantially clean by the action of scraper 48 and the solution from coating hopper 46 is then applied to this clean surface.

It will be apparent that the solution in tank 36 will, upon prolonged operation of the apparatus, be conveyed repeatedly past the surface of cathode 22 as a result of which the silver ion concentration in the solution will gradually decrease while the thickness of the silver plate formed on the cathode surface will gradually increase. As soon as the thickness of the silver plate formed on cathode 22 reaches a desired value, or removal of the silver ions present in the solution is substantially complete, operation of the apparatus is stopped, cathode 22 is disconnected and the silver plate is peeled off, or removed by other suitable means, which may operate by mechanical and/or chemical action as is known in the art. Cathode 22 is then put back in place and the apparatus is ready for use in treating a second batch of the photographic fixing solution. After removing the silver plate and prior to putting the cathode back into use it may be desirable, in some instances, to repolish the cathode surface.

Among the features of this invention which are of greatest importance are the cylindrical rotary electrode and the thin closely spaced flexible sheet electrode. This form of electrode construction permits an extremely short path between the electrodes, so that the distance the metal ions must move to reach the plating surface is small, while at the same time providing effective agitation of the solution within the gap separating the electrodes. As a result of the rotation of the cylindrical electrode and the fact that the sheet electrode is flexible and free to adjust itself with respect to the cylindrical electrode, the thin layer of solution is subjected to strong shearing forces, particularly in the region adjacent the sheet electrode, and the resulting agitation provides mixing in a direction perpendicular to the plating surface to thereby replenish metal ions as they are depleted from immediately adjacent this surface. Such action provides for efficient recovery of the metal, even from solutions which are highly viscous and, accordingly, exhibit low ion mobility. It should be noted that the flexible nature of the sheet electrode permits it to adjust its position in relation to the cylindrical electrode as the thickness of the metal plate increases. In effect, the electrode spacing is self-adjusting and the tendency is for a minimum spacing, depending in magnitude on the amount of solution being treated, to be established.

As previously indicated, either the cylindrical electrode or the sheet electrode may serve as cathode and, thus, as the surface on which the metal plate is formed. Each of these methods of operation has certain advantages. For example, an important advantage of having the sheet electrode serve as cathode is that maximum shearing action takes place adjacent to the sheet electrode and it is advantageous to have the greatest degree of shear and, consequently, of agitation within the solution at the plating surface. A further advantage, is that a flexible sheet electrode can be made at very low cost so that it is economically feasible to dispense with the step of stripping the metal plate from the sheet electrode, if desired, and instead replace it with a new one and recover the metal by smelting the plated electrode. On the other hand, by having the cylindrical electrode serve as cathode it may be feasible to permit the build-up of a thicker layer of metal before stripping it off and removal of the metal plate without partially dismantling the apparatus is more easily accomplished. If the cylindrical electrode is to serve as the cathode, however, it is essential that the solution be removed from the cylindrical surface after it has traversed the gap between the electrodes without breaking off the metal plate which has formed and this is most effectively accomplished by use of an air knife rather than a scraper.

The cylindrical electrode utilized in the apparatus of this invention may be of solid or hollow construction and may be composed of any suitable electrode material, such as stainless steel or graphite. Rotation of the cylindrical electrode can be accomplished by any suitable means known to the art, for example, by use of an electric motor in conjunction with a speed reducer providing continuously variable speed control over a broad range. The cylindrical electrode is usually of substantially the same width as the sheet electrode, i.e. the electrodes are in substantially coextensive relation, but it may in some instances be advantageous to make the cylindrical electrode somewhat wider and not apply solution all the way to the edges of the cylindrical surface.

The solution to be treated can be applied to the surface of the rotating cylindrical electrode in various ways known to the art, such as by use of a hopper or other coating device, and can be stripped from the cylindrical surface after traversing the length of the gap between the electrodes in any convenient manner, such as by use of a scraper or an air knife. Since the space between the electrodes should be maintained full of solution at all times so as to maintain a steady flow of electric current, the pump supplying the solution to the coating hopper should be of adequate capacity for this purpose and should deliver a steady and uniform flow.

In accordance with this invention, the sheet electrode is constructed in the form of a thin conductive flexible sheet and may, for example, be made from stainless steel or from brass. Whatever material is used, when the sheet electrode serves as cathode, it is preferred that it be highly polished on the surface opposite the anode as this promotes uniformity in the thickness of the metal plate formed and facilitates easy removal of the plate. Stainless steel sheeting of from about two to about ten mils in thickness is particularly well adapted for this purpose. Support for the flexible sheet electrode can be provided in any suitable manner but should be such that it is free to adjust itself to a substantially constant spacing with respect to the cylindrical electrode, the actual spacing in a particular instance being determined by the flow rate of the solution. Thus, in effect, the sheet electrode "floats" on the surface of the moving solution and thereby maintains a uniform gap and good electrical contact between the solution and the electrode surface, as well as providing good shearing action and resultant agitation within the solution.

As would be apparent to one skilled in the art, other suitable materials in addition to those mentioned such as, for example, platinum, platinized titanium, or carbon foil, may be utilized in the construction of the electrodes, if desired.

The fluid forces within the solution tend to hold the flexible sheet electrode in close proximity to the moving cylindrical electrode but the width of the gap between them will be determined by the amount of solution per unit of width conveyed by the rotating cylindrical electrode. Control over the degree of agitation provided is readily achieved by varying the speed of rotation. The combination of very close spacing between the electrodes and constant agitation of the solution as it passes through the gap permits the treatment of highly viscous solutions which conventional electrolytic cells are incapable of handling. The particular structural relationship between the electrodes disclosed herein is an important factor in providing this capability. In spite of the great number of different types of electrolytic apparatus heretofore proposed for use in recovering a metal from a solution, the apparatus of this invention is unique in that it is the only one that utilizes the solution itself to separate the electrodes and to maintain them in proper spaced relationship to one another.

In the apparatus of this invention, the spacing between the electrodes should be made as small as is practical so as to minimize the distance that the metal ions must travel to reach the plating surface. Optimum spacing will depend upon the particular requirements of the specific application involved, but, as will be apparent, the upper limit on spacing is dictated by the need to maintain a practical recovery rate and to agitate all of the solution within the gap between the electrodes and the lower limit by the need to provide a reasonable flow rate of solution and by the requirement that bridging of metal between the electrodes, and consequent shorting of the apparatus, be avoided. Thus, the spacing should, in general, be less than about 50 mils (0.05 inch) and may be as little as about 2 mils (0.002 inch). Preferred spacings are in the range from about 3 to about 20 mils. Considering the fact that this spacing is very small, and the need to minimize the risk of short circuits caused by contact between the electrodes, it is preferred to provide thin circumferential strips of electrically non-conductive material which are attached to the cylindrical electrode near the peripheral edges thereof, as hereinbefore described. These strips may be composed of any suitable insulating material, such as rubber or polytetrafluoroethylene.

The contact time, i.e. the time which a particular element of solution spends within the region between the opposing electrode surfaces, is determined by both the speed of rotation of the cylindrical electrode and the length of the sheet electrode. The degree of agitation to which the solution is subjected is also directly related to the speed of rotation. While this speed is, accordingly, very important it is not narrowly critical and may be varied over a wide range, as desired, depending on the other parameters of the process, as long as it is at least sufficient to provide adequate agitation of the solution within the gap separating the electrodes. Speeds from as low as about 5 revolutions per minute, or less, to as high as about 200 revolutions per minute, or more, can be utilized with good results in practicing this invention. Preferred speeds are in the range from about 10 to about 100 revolutions per minute. Of course, the results achieved with the apparatus of this invention will depend upon a number of factors in addition to the speed of rotation, such as, for example, the spacing between the electrodes, the temperature, the solution viscosity, the voltage, and so forth. These variables may be adjusted so as to achieve optimum performance in any particular application, as would be apparent to one skilled in the art.

The apparatus of this invention is ordinarily operated at room temperature but higher temperatures can be employed if desired. The effect of increasing the temperature is to cause a reduction in the viscosity of the solution and an increase in ion mobility, with the result that the efficiency of the recovery of the metal is improved.

The electric current required to operate the apparatus is provided in accordance with conventional practice in the art. Thus, the current may be provided by, for example, a D.C. power supply unit including a rectifier and voltage regulator or it may be provided by a battery.

The electrolytic apparatus described herein can be operated at constant voltage or at constant amperage. If it is operated at constant voltage, the amperage decreases as the metal ion concentration in the solution decreases and, in consequence, the rate of recovery decreases. On the other hand, if the cell is operated at constant amperage, the voltage rises as the metal ion concentration decreases but the rate of recovery is constant. In continuous processing, the metal ion concentration will reach an equilibrium and the mode of operation will not matter but in batch operation the choice of constant voltage or constant amperage operation can be an important factor. For example, in recovering silver from viscous photographic fixing solutions by a batch operation it is preferable that the apparatus be operated at constant voltage rather than at constant amperage so as to avoid the risk of the voltage rising to the point where sulfiding will occur, i.e. where sulfide ions will be removed from the fix and plate out with the silver, usually as silver sulfide. Good results are ordinarily obtained with viscous photographic fixing solutions using voltages of from about 0.5 volt to about 2 volts. The voltage at which sulfiding occurs will generally determine the maximum current that can be used and this voltage is dependent upon such factors as the silver ion concentration, the pH, and the chemical composition of the fixing solution. Current densities of up to about three amperes per square foot have been found to be feasible under typical conditions in treating viscous fixing solutions with the apparatus described herein.

The apparatus of this invention is applicable to treatment of many different metal-ion-containing solutions of varying composition and viscosity. In application to viscous photographic fixing solutions, the specific composition of the fix is not important so that the invention may be employed with equal facility with, for example, basic non-hardening, acid hardening, or ammonium hpyo types of fixing solutions. Similarly, the viscosity of the viscous fix is not critical and may, for example, vary from several hundred centipoises, or less, to several thousand centipoises, or more, at the temperature of operation. Moreover, the cell may be employed, if desired, with conventional non-viscous photographic fixing solutions although its advantages are most fully realized with viscous solutions. Good results can be obtained with fixing solutions having an initial silver concentration of from as little as one gram per liter to as much as 10 grams per liter. The desilvered fixing solution which is recovered may be reused, following suitable replenishment in a manner known to the art.

While operation of the apparatus of this invention has been specifically illustrated herein by reference to the method in which a batch of solution is recirculated until the desired reduction in metal ion concentration is achieved, it will be apparent that other methods of operating the apparatus are also feasible. Thus, for example, where sufficient reduction in the metal ion concentration can be achieved by a single pass through the gap separating anode and cathode the use of recirculation can be eliminated and the coating hopper can be connected directly to a source of the solution to be treated. Operation would then be continued until the maximum permissible thickness of metal plate on the cathode had built up and this plate would then be stripped off and the apparatus placed back into operation. It will also be apparent that the apparatus could be adapted for continuous operation in which metal-ion-containing solution is continuously supplied to the coating hopper and the metal plating out on the cathode is continuously or intermittently stripped off.

Apparatus constructed in accordance with the disclosure herein was operated to recover silver from viscous photographic fixing solutions with excellent results. The apparatus was constructed with the anode in the form of a stainless steel drum 5 inches wide and 10 inches in diameter and with the flexible cathode formed from stainless steel shim stock with a thickness of 5 mils. The drum was driven by a variable speed motor of providing speeds of up to 150 revolutions per minute. Silver was successfully recovered from viscous fixing solutions having silver concentrations varying from 2.5 to 10 grams per liter, using voltages of 1.5 to 2 volts, a current density of up to 3 amperes per square foot, anode speeds of from 5 to 115 revolutions per minute, and flow rates of fixing solution sufficient to provide a spacing between anode and cathode of about 5 mils.

The invention has been described in detail with particular reference to preferred embodiments thereof, but it will be understood that variations and modifications can be effected within the spirit and scope of the invention as described hereinabove and as defined in the appended claims.

I claim:
1. An apparatus for recovering a metal from a solution containing ions of said metal, comprising:
    (1) a cylindrical electrode mounted for rotation about its longitudinal axis;
    (2) means for rotating said cylindrical electrode;
    (3) a flexible sheet electrode narrowly spaced from and partially surrounding the cylindrical surface of said cylindrical electrode, said sheet electrode being free to adjust itself to a substantially constant spacing with relation to said cylindrical electrode;
    (4) means for impressing an electric potential between said electrodes; and
    (5) means for applying said solution to the cylindrical surface of said cylindrical electrode so that the rotation of said cylindrical electrode conveys said solution through the space between said cylindrical electrode and said sheet electrode and causes said sheet electrode to assume a position of substantially constant spacing with respect to said cylindrical electrode, whereby said metal ions in said solution are caused to plate out on the electrode which is of lower potential.

2. An apparatus as described in claim 1 wherein the electrodes are separated by a gap of about 2 to about 50 mils.

3. An apparatus as described in claim 1 wherein the electrodes are separated by a gap of about 3 to about 20 mils.

4. An apparatus as described in claim 1 wherein the means for applying the solution to the cylindrical surface of the cylindrical electrode is a coating hopper extending across substantially the full width of the cylindrical electrode.

5. An apparatus as described in claim 1 wherein the means for rotating the cylindrical electrode is a variable speed motor.

6. An apparatus as described in claim 1 including a thin strip of electrically insulating material positioned near each peripheral edge of the cylindrical electrode and extending completely around the circumference thereof.

7. An apparatus as described in claim 1 wherein said flexible sheet electrode is composed of stainless steel having a thickness of from about 2 to about 10 mils.

8. An apparatus as described in claim 1 including a scraper mounted to engage the cylindrical surface of the rotating cylindrical electrode and strip adhering solution therefrom.

9. An apparatus as described in claim 1 including an air knife arranged to effect removal of the adhering layer of solution from the cylindrical surface of the rotating cylindrical electrode.

10. An apparatus as described in claim 1 wherein the sheet electrode serves as cathode and the cylindrical electrode serves as anode.

11. An apparatus as described in claim 1 wherein the sheet electrode serves as anode and the cylindrical electrode serves as cathode.

12. An apparatus for receiving silver from a viscous photographic fixing solution containing silver ions, comprising:
(1) a cylindrical anode mounted for rotation about its longitudinal axis;
(2) means for rotating said anode at speeds from about 10 to about 100 revolutions per minute;
(3) a cathode in the form of a flexible stainless steel sheet of about 2 to about 10 mils in thickness spaced from and partially surrounding the cylindrical surface of said anode, said cathode being free to adjust itself to a substantially constant spacing of from about 3 to about 20 mils with relation to said anode;
(4) means for impressing an electric potential between said anode and said cathode;
(5) a thin strip of electrically insulating material positioned near each peripheral edge of said anode and extending completely around the circumference of said anode;
(6) a scraper mounted to engage the cylindrical surface of said rotating anode and strip adhering solution therefrom; and
(7) means including a coating hopper extending across substantially the full width of said anode for uniformly applying said solution to the cylindrical surface of said anode so that the rotation of said anode conveys said solution through the space between said anode and said cathode and causes said cathode to assume a position of substantially constant spacing with respect to said anode, whereby said silver ions in said solution are caused to plate out on said cathode by the action of said electric potential.

References Cited
UNITED STATES PATENTS

| | | | |
|---|---|---|---|
| 1,884,512 | 10/1932 | Ballard | 204—212 |
| 2,044,415 | 6/1936 | Yates | 204—216 |
| 2,852,450 | 9/1958 | Mundell | 204—212 |
| 2,997,438 | 8/1961 | James et al. | 204—273 |
| 3,461,046 | 8/1969 | Clancy | 204—216 |

JOHN H. MACK, Primary Examiner

T. TUFARIELLO, Assistant Examiner

U.S. Cl. X.R.

204—216, 273, 281, 286